Feb. 9, 1960 A. G. COOLEY 2,924,659
TELEFACSIMILE DRIVE AND SYNCHRONIZING SYSTEM
Filed March 18, 1955 2 Sheets-Sheet 1

INVENTOR.
A. G. COOLEY
BY E. R. Evans
his attorney

Feb. 9, 1960 A. G. COOLEY 2,924,659

TELEFACSIMILE DRIVE AND SYNCHRONIZING SYSTEM

Filed March 18, 1955 2 Sheets-Sheet 2

INVENTOR.
A.G. COOLEY
BY E. R. Evans
his attorney

United States Patent Office 2,924,659

Patented Feb. 9, 1960

2,924,659

TELEFACSIMILE DRIVE AND SYNCHRONIZING SYSTEM

Austin G. Cooley, New York, N.Y., assignor to Digital Control Systems, Inc., Beverly Hills, Calif., a corporation of California Application March 18, 1955, Serial No. 495,176

5 Claims. (Cl. 178—69.5)

This invention relates to telefacsimile apparatus and more particularly to the mechanism employed for driving the recorder-scanning member of such apparatus at the desired speed and phase relationship.

The object of the invention in general terms is to provide an improved drive mechanism for a facsimile recorder or transmitter. It may be utilized in the well-known recorder which has one motor to overcome the frictional and phasing power losses and a second synchronous motor interconnected therewith to maintain the scanning member at a predetermined synchronous speed.

In some cases in practise the transmitter is phased and synchronized with the recorder but generally the transmitter is started up first and operated at synchronous speed; then the recorder scanning element or stylus is phased and synchronized with the transmitter scanning element. For the sake of simplicity, reference will be made therefore to controlling the phase and synchronous speed of a recorder-scanning means or element. This should be understood to mean either the scanning element of the transmitter or the recording assembly of the recorder, depending upon whether the mechanism is used in a transmitter or a recorder.

A telefacsimile recorder employing a dual motor drive system which is widely used in practise is described in my prior Patent No. 2,492,621 granted December 27, 1949, and assigned to the assignee of the present application. The present invention is particularly applicable to a system of the character shown in said prior patent in which a rotatable phasing member used to control the phase of the scanning member or drum is rotated through a one-way clutch by the synchronous motor, and is connected through a special mechanical coupling means to the scanning element or drum. The arrangement in its preferred form is designed to permit the phasing member to be brought to predetermined speed and angular phase relation corresponding to the speed and phase of the transmitter scanning element without starting up the recorder scanning element. However when the transmission of a message is started, the overdrive or run motor is energized to actuate the recorder scanning element or drum, which then becomes locked in at the proper speed and phase relation by the coupling system to the synchronous phasing member. Thus the predetermined speed and phase of the phasing member may be set at any time prior to the transmission of the message or may be left in synchronism for two or more messages without rephasing. Until the message starts, however, the drum may be at rest or in the case of a continuous web-type recorder, the paper feed stopped. When the message starts, the recorder can be started and commence recording immediately since the phasing member has already been phased and is operating at predetermined or synchronous speed.

However with this construction the recording drum or recorder stylus mechanism is brought into phase by driving it above synchronous speed until it catches up with the phasing member. On account of the various indeterminate factors involved, such as changes in friction loading or variations in supply voltage or frequency of the power supply for the facsimile machine, the over drive or run motor must be designed and operated to provide ample power under all conditions. Therefore under certain conditions it may drive the recorder mechanism at an excessive speed when catching up with the phasing member, and the impact through the coupling to the phasing member is likely to apply such a heavy load on the synchronous motor as to knock it out of synchronism, particularly as a small synchronous motor of limited power is employed. Cushioning cannot be provided to absorb this impact since the driving contact must be solid and rigid in order to prevent any flutter in the drive system.

Stated in other terms, therefore, the object of this invention is to overcome this difficulty by providing a dynamic mechanical system to absorb the impact between the overdrive motor and the synchronous motor at the instant of the impact between the overdrive system and the phasing member. In other words, the object of the invention is to absorb the excess kinetic energy in the overdrive system without transferring more than a very little of it to the synchronous motor.

The invention enables facsimile systems of the overdrive type to operate at more than one speed. Without the kinetic energy absorbing device it is difficult to design into the system the proper forces between the synchronous and overdrive mechanisms for a wide range of speeds.

Other objects and advantages of the invention will appear from the following detailed description of a preferred embodiment which is shown in the accompanying drawings, wherein—

The invention is particularly applicable to a continuous recorder in which the recording mechanism is driven by separate drive and synchronous motors, the drive or "run" motor supplying the power necessary to overcome the bearing friction of the recording mechanism, and the synchronous motor of limited power being used to maintain the recording mechanism at a predetermined or synchronous speed. However the invention may be embodied in other types of recorders and also in transmitters having a movable scanning mechanism where the facsimile system contemplates phasing and synchronizing the transmitter with the remote recorder. Thus while a system embodying the invention is illustrated in connection with a continuous facsimile recorder of the multiple-stylus type, it may be used to advantage with other motor-driven mechanisms which involve a similar problem of impact in the drive system which may result from the use of two independent motors.

Figure 1:
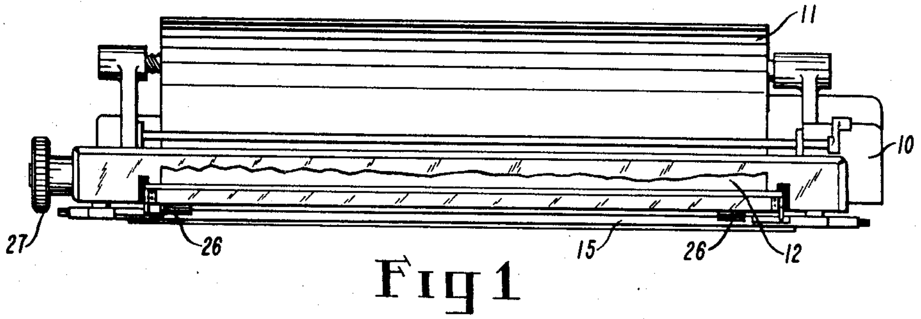
Figs. 1 and 2 are top and front elevational views, respectively, of a continuous facsimile recorder embodying a preferred phasing and synchronizing mechanism.
Figure 2:
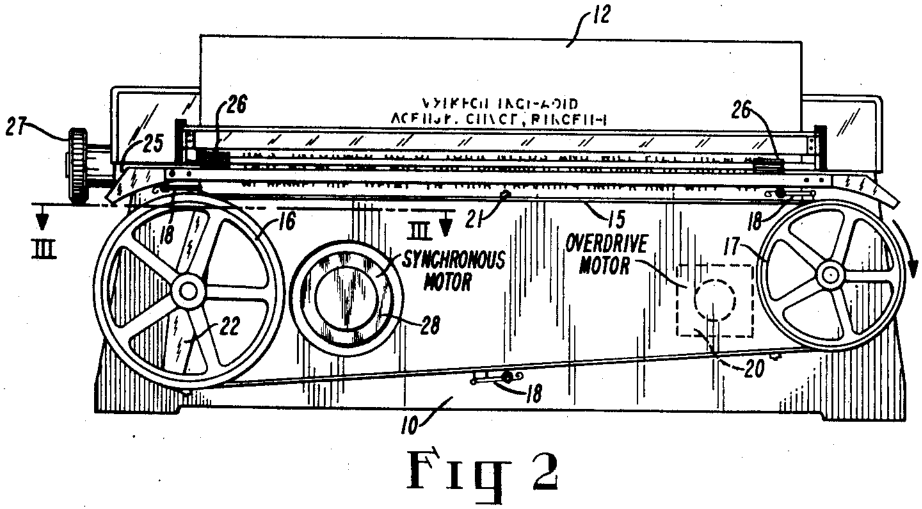

Referring to Figs. 1 and 2, the recorder shown comprises a base 10 upon which is mounted a paper supply roll 11 adapted to support and feed a recording sheet or continuous web 12 in front of the recording mechanism of the recorder. As shown by way of example, the recording mechanism comprises a movable stylus band 15 supported upon spaced pulleys or wheels 16 and 17, and carrying a plurality of equally spaced recording styli 18.

The stylus band 15 traverses the recording styli 18 across the face of the recording sheet 12, the tip of each stylus being adapted to engage the face of the sheet so that when a current is applied to the stylus in the recording area, the sheet will be marked as well known in the art.

The detailed construction of a continuous recorder of this type is illustrated in my prior Patents Nos. 2,643,173 and 2,643,174, dated June 23, 1952, and assigned to the assignee of the present application, the disclosures of said patents being incorporated herein by reference. The present invention relates particularly to the construction and operation of the motor drive and phase mechanism for the recording mechanism and, for the sake of simplicity, a detailed description of the other parts of the recorded not necessary to an understanding of the invention will be omitted.

Figure 3:
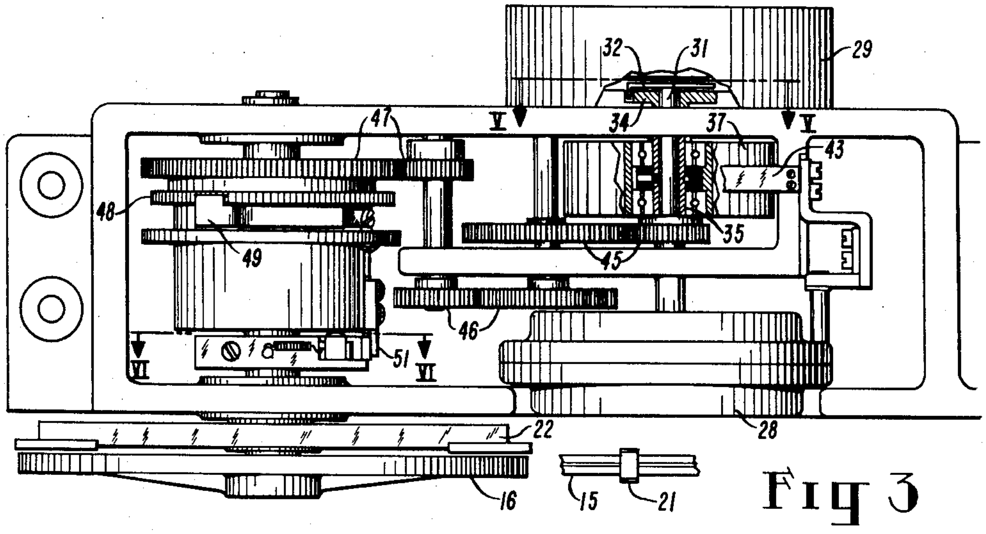
Fig. 3 is a sectional view taken on the line III—III of Fig. 2.

Referring to Figs. 2 and 3, the supporting wheel 16 for the band 15 is freely rotatable whereas the wheel 17 is positively driven by a drive motor 20 through reduction gearing (not shown). Thus the wheel 17, by its frictional engagement with the stylus band 15, serves to propel the band and the recording styli thereon. Neither of the wheels has salient teeth or drive elements on its periphery. The motor 20 may be of the low inertia induction type or any other suitable type which has a drooping load-speed characteristic and will tend to propel the band 15 above the predetermined or synchronous speed. During operation the stylus band 15 is held back to synchronous speed by engagement of the lugs 21 at the edge of the band with the synchronous speed control arm 22 as explained or described more completely in the above-mentioned Patent No. 2,643,174 and in my copending application, Ser. No. 460,816 filed October 7, 1954, now Patent No. 2,814,547, issued November 26, 1957.

Referring again to Figs. 1 and 2, the recorded as shown further comprises a feed roll 25 and a plurality of small pressure rollers 26 to hold the sheet 12 in frictional engagement with the feed roll 25. The feed roll is driven either by the motor 20 or by a separate feed motor and serves to feed the paper 12 at a uniform rate during the recording operation. A hand wheel or knob 27 may be attached to one end of the feed roll 25 as shown to facilitate manual feeding of the paper through the recorder, as in reloading.

Figure 4:
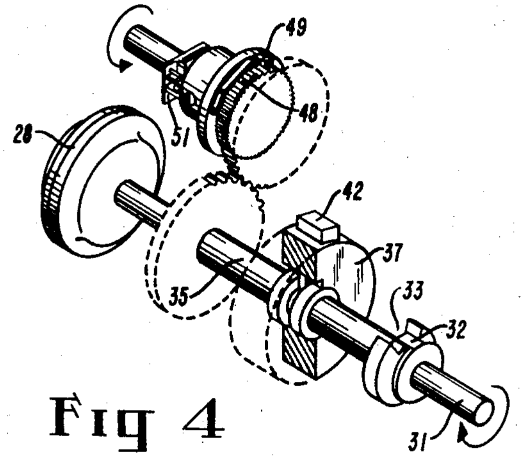
Fig. 4 is a schematic detailed view in perspective of the shock absorbing mechanism and the synchronous motor drive.

The overdrive motor 20 is connected as described through suitable reduction gearing to the supporting wheel 17 for the stylus band but is normally not started until after the recorder phasing mechanism has been phased with the remote transmitter. The speed control arm 22, on the other hand, is connected through the phasing mechanism and a ratchet clutch mechanism to the synchronous motor 28 (see Fig. 3 and 4). As shown in Fig. 3 a start motor 29 is provided on the end of the shaft 31 of the synchronous motor 28 to bring the synchronous motor up to synchronous speed preliminary to phasing and starting the recorder.

Figure 5:
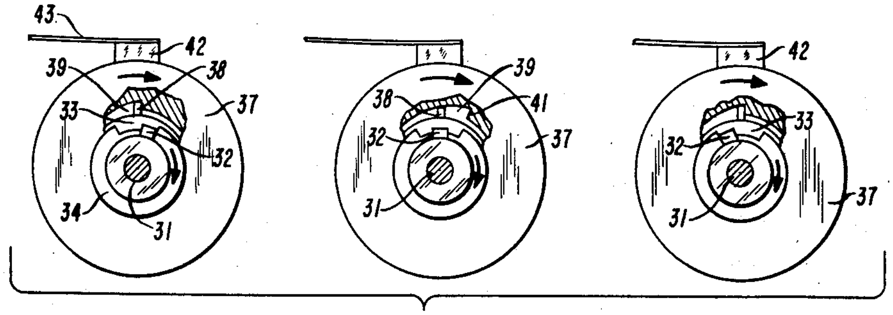
Figs. 5 and 6 are fragmentary sectional views showing the flywheel, lost-motion connection and phasing mechanism in various operating positions, taken on the lines V—V and VI—VI, respectively, of Fig. 3.

The shaft 31 of the synchronous motor has attached thereto a drive dog 32 (see Figs. 3, 4 and 5) adapted to engage a slot 33 in a concentric collar 34. The slot 33 is wider than the end of the drive dog 32 to provide a lost-motion connection between the shaft 31 and the sleeve 35 which is attached to the collar 34. This provides lost motion between the shaft 31 and sleeve 35 as illustrated in Fig. 5, which shows the drive dog in its righthand and left hand positions in the slot 33.

A flywheel 37 is journaled on the sleeve 35, preferably on frictionless bearings mounted between the sleeve and the flywheel as shown in (Fig. 3). The flywheel is rotated with the sleeve 35 by an overrunning clutch consisting of a pin 38 in the sleeve 35 and a cam slot 39 in the flywheel. As shown in Fig. 5, one end of said slot presents a shoulder 41 with which the pin 38 engages to turn the flywheel normally at the same rotative speed as the sleeve 35. The pin 38 is supported by a spring (not shown), so that it may be depressed by the cam slot as shown in the middle view of Fig. 5 when the speed of the flywheel exceeds that of the sleeve 35. A light friction brake member 42 is supported on a leaf spring 43 in a position to engage the periphery of the flywheel 37. The function of the flywheel 37 is to absorb the kinetic energy of the drive system including the rotor of the drive motor 20 when the recording mechanism reaches the desired speed and phase relation as will be explained below.

Figure 7:
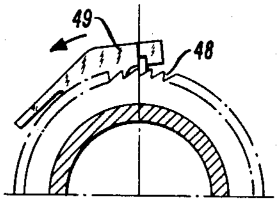
Fig. 7 is a detail view of the ratchet clutch of Fig. 3.

Referring again to Fig. 3, the sleeve 35, which is rotated at a synchronous predetermined speed by the synchronous motor 28 and the drive dog 32, is connected through the gears 45, 46 and 47 to a ratchet clutch mounted on the axis of the speed control arm 22 and consisting of a ratchet wheel 48 and a pivoted spring-pressed pawl 49 (see Figs. 3 and 7). The ratchet clutch 48, 49 is preferably of the type shown and described in my prior Patent No. 2,492,621 referred to above or the equivalent. Essentially the teeth on the pawl and the ratchet wheel are so shaped as to provide a positive drive when the pawl 49 is driven in the direction indicated by the arrow in Fig. 7; and on the other hand, a slight drive torque is exerted upon the pawl 49 when the ratchet wheel 48 is also driven in the counter-clockwise direction (as shown in Fig. 7). However in the latter instance, if the pawl 49 is stopped, the ratchet wheel 48 slips freely past the pawl without stalling the synchronous motor 28. When the phasing mechanism is actuated the rotation of the pawl 49 is stopped, but under these conditions the ratchet wheel 48 can be rotated by the synchronous motor.

Figure 6:
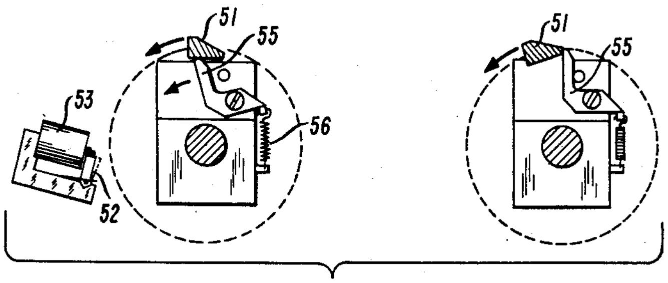

The phasing system for phasing the recording mechanism with the scanning mechanism of the remote transmitter includes the phasing lug or latch member 51 (see Figs. 3 and 6) which is supported for rotation with the clutch pawl 49 and is mounted in a position to be engaged by the pivoted armature 52 of the phase magnet 53. As well known in the art, the receipt of an electrical control or phasing pulse energizes the phasing magnet 53 and releases the phasing member 51 so that it rotates in a predetermined phase relation corresponding to that of the transmitter scanning member. The rotational torque for the phasing member 51 is supplied from the motor 28 through the ratchet clutch 48, 49 and its above described connection with the synchronous motor 28. The phasing member 51 will be stopped by the armature 52 of the phasing magnet until the phasing pulse is received from the remote transmitter. This releases the phasing member 51 and it continues to rotate at synchronous speed and at an angular position corresponding to the position of the remote transmitting scanner.

When transmission of a message is started the signal circuit is connected to the recording styli 18 and the overdrive motor 20 is started, either manually or in response to a start signal. The motor 20 drives the stylus band 15 through the wheel 17, and since it tends to operate above synchronous speed, the lugs 21 on the band rotate the speed control member 22 above synchronous speed. Accordingly the latch 55 will catch up to the phasing member 51 and engage the same (see Fig. 6, right-hand view) so that the recording system is held at the position which corresponds to the in-phase position relative to the remote transmitter. Since the phasing member 51 is connected through the one-way drive clutch 48, 49 to the synchronous motor 28, it will be held to the predetermined or synchronous speed by said motor. At the moment of impact however between the latch 55 and the phasing member 51 the kinetic energy of the recording system tends to drive the phasing member 51 and connected members above synchronous speed. This impact cannot be cushioned by springs or the like because the drive contact must be solid or rigid in order to prevent any flutter in the drive system for the recording styli 18.

In accordance with the invention the kinetic energy of the impact is absorbed by the flywheel 37 in order to prevent the possibility of knocking the synchronous motor out of synchronism. At the moment of impact the drive dog 32 on the motor shaft 31 is in the position in the slot 33 shown in the left hand view of Fig. 5. As the force of impact is applied to the phasing member 51 the sleeve 35 exerts an additional driving force through the pin 38 upon the flywheel 37 to thereby absorb all or most of the kinetic energy of the impact. At the same time the lost motion in the connection formed by the drive dog 32 and slot 33 disables the driving connection between the shaft 31 and the sleeve 35, the drive dog eventually reaching the position in the slot shown in the right hand view of Fig. 5 where the sleeve 35 tends to drive the shaft 31 of the synchronous motor 28. The friction brake 42 eventually slows down the flywheel 37 until the shoulder 41 in the cam slot 39 again rests against the drive pin 38 as shown in said right hand view. If desired, another type of brake such as a magnetic brake can be used in place of a friction brake.

Thus it will be apparent that the invention provides a simple and effective arrangement for absorbing a substantial amount of the kinetic energy of the drive system as its speed is reduced to that of the phasing member, and the synchronous motor 28 is prevented from being thrown out of synchronism. Although it is shown for purposes of explanation as embodied in a continuous recorder of the multiple-stylus type, obviously it may be employed in other machines where the same problem is encountered.

The detailed showing of the preferred embodiment of the invention is purely illustrative and the invention is not limited thereto, various changes in the construction shown being possible without departing from the scope of the invention as defined in the appended claims.

I claim:

1. In a precision synchronous mechanism to be operated at a predetermined synchronous speed and phase relation, a first motor connected to said mechanism and tending to drive the same above said predetermined synchronous speed, and means including a synchronous motor for holding the speed of said mechanism to said predetermined synchronous speed, said means further comprising a drive connection between said synchronous motor and said mechanism including, first, a lost-motion connection, second, means including a drive coupling whereby the mechanism, when driven by said first motor above said predetermined synchronous speed, rotates the drive connection of the synchronous motor up to said lost-motion connection above synchronous speed, third, a rotatable flywheel mounted for rotation with one element of said lost-motion connection and a drive member engaging the flywheel to transfer the kinetic energy of said first motor and its driven elements to said flywheel before said first motor is connected in driving relation through the lost-motion connection to said synchronous motor.

2. In a drive and synchronizing system of the character described for a telefacsimile machine, in combination, a movable recording-scanning element to be driven at predetermined speed and phase relation, a first motor for supplying power to drive said movable element and connected thereto, said first motor being of the non-synchronous type and tending to drive said element above said predetermined speed, a synchronous motor operative to hold said movable element at said predetermined speed during operation of the telefacsimile machine, a rotatable phasing member for controlling the angular position of the drive system to position said movable recording-scanning element in phase with the corresponding element of the remote transmitting or recording machine, means for stopping and then releasing said phasing member in desired phasing relation, a lost-motion driving connection between said synchronous motor and said rotatable phasing member, a flywheel normally rotating at a speed corresponding to said predetermined speed and means including an over-running clutch for accelerating said flywheel to absorb the impact of the drive from said first motor when said recording-scanning element is accelerated to the desired phase position.

3. In a drive and synchronizing system of the character described for a telefacsimile machine, in combination, a movable recording-scanning element to be driven at predetermined speed and phase relation, a first motor connected to said movable element and tending to drive said element above said predetrmind speed, a synchronous motor, means for connecting said synchronous motor to said movable element to hold the same at said predetermined speed during operation of the telefacsimile machine, said means including a lost-motion driving connection, interposed between said first motor and said synchronous motor, a pivoted flywheel and an overrunning drive member for said flywheel mounted for rotation with the driven member of said lost-motion connection with respect to said synchronous motor, to absorb a substantial part of the kinetic energy of the drive from said first motor when it exceeds the rotative speed of the synchronous motor in driving the recording-scanning element to the desired phase position.

4. In a drive and synchronizing system of the character described for a telefacsimile machine, in combination, a movable recording-scanning element to be driven at predetermined speed and phase relation, a first motor connected to said movable element and tending to drive said element above said predetermined speed, a synchronous motor, a driving connection between said synchronous motor and said movable element, said driving connection including a slip clutch to permit operation of the synchronous motor at synchronous speed while said movable element is at first rest or below said predetermined speed, said driving connection also including a lost-motion connection, a pivoted flywheel and an over-running drive member for said flywheel to absorb a substantial part of the kinetic energy of the drive from said first motor while slack in the lost-motion connection is taken up when the speed of the first motor drives the movable element above said predetermined speed.

5. In telefacsimile apparatus of the character described for synchronized operation with a remote machine, in combination, recorder-scanning means including a band to be driven at predetermined synchronous speed and phase relation, a rotatable drive wheel engaging and supporting said band, means including a first motor connected to said wheel tending to drive said band above said predetermined synchronous speed, a synchronous motor for holding the band at said predetermined speed during the transmitting period and a main drive connection between said synchronous motor and said band, said main drive connection including first, a lost-motion connection, second, a band-coupled member moving in a manner corresponding to the movement of the band, third, means including a drive coupling adjacent said band-coupled member whereby the band-coupled member, when driven by said first motor above said predetermined synchronous speed rotates said main drive connection up to the lost-motion connection above synchronous speed, and fourth, a rotatable flywheel mounted for rotation with one element of said lost-motion connection to transfer the kinetic energy of the first motor and its driven elements including the band-coupled member and main drive connection to said flywheel before said first motor is connected in driving relation through the lost-motion connection to said synchronous motor.

References Cited in the file of this patent

UNITED STATES PATENTS

| | | |
|---|---|---|
| 2,355,369 | Finch | Aug. 8, 1944 |
| 2,639,211 | Hallden | May 19, 1953 |
| 2,643,173 | Cooley | June 23, 1953 |